(12) United States Patent
Kim et al.

(10) Patent No.: US 8,213,400 B2
(45) Date of Patent: Jul. 3, 2012

(54) COLLISION-FREE BEACON SCHEDULING METHOD BASED ON DISTRIBUTED ADDRESS ASSIGNMENT SCHEME

(75) Inventors: Jae-Ho Kim, Seoul (KR); Min-Hwan Song, Seoul (KR); Il-Yeup Ahn, Seoul (KR); Sang-Shin Lee, Seoul (KR); Tae-Hyun Kim, Seoul (KR); Kwang-Ho Won, Seoul (KR)

(73) Assignee: Korea Electronics Technology Institute, Seongnam, Gyeonggi-province (KR)

( * ) Notice: Subject to any disclaimer, the term of this patent is extended or adjusted under 35 U.S.C. 154(b) by 669 days.

(21) Appl. No.: 12/394,946

(22) Filed: Feb. 27, 2009

(65) Prior Publication Data

US 2010/0157914 A1  Jun. 24, 2010

(30) Foreign Application Priority Data

Dec. 24, 2008  (KR) .......................... 10-2008-0133933

(51) Int. Cl.
*H04J 3/00* (2006.01)

(52) U.S. Cl. ........................................ 370/345; 370/329

(58) Field of Classification Search .................. 370/329, 370/345, 347
See application file for complete search history.

(56) References Cited

U.S. PATENT DOCUMENTS

2004/0114563 A1* 6/2004 Shvodian ...................... 370/347
2007/0201423 A1* 8/2007 Laroia et al. .................. 370/345
* cited by examiner

*Primary Examiner* — Andrew Lai
(74) *Attorney, Agent, or Firm* — Lowe Hauptman Ham & Berner, LLP (57) ABSTRACT

Provided is a beacon scheduling method based on a distributed address assignment scheme that schedules a beacon and minimizes data delay using non-collision of addresses in a network, such as a ZigBee network, that provides a distributed address system. In the method, a time offset $T_n$ between beacon reception from a parent device and beacon transmission of a device in a wireless network system having a tree structure may be obtained from $T_n = SD \times (1 + O_n \times B_d)$ according to an address of the device determined by a distributed address assignment mechanism to create a beacon transmission schedule, where SD denotes a super-frame duration, $O_n$ denotes a value for determining which child among sibling devices in the network the device corresponds to, and $B_d$ denotes a maximum number of router devices that a sub-network having a depth d in a tree can have.

16 Claims, 4 Drawing Sheets

page omitted …

COLLISION-FREE BEACON SCHEDULING METHOD BASED ON DISTRIBUTED ADDRESS ASSIGNMENT SCHEME

CROSS-REFERENCE TO RELATED APPLICATION

This application claims the benefit under 35 U.S.C. §119 (a) of a Korean Patent Application No. 10-2008-0133933, filed on Dec. 24, 2008, the disclosure of which is incorporated herein by reference in its entirety.

TECHNICAL FIELD

The following description relates to a beacon scheduling method, and more particularly, to a beacon scheduling method based on a distributed address assignment scheme that schedules a beacon and minimizes data delay using non-collision of addresses in a network, such as a ZigBee network, that provides a distributed address system.

BACKGROUND

In recent years, a ZigBee has been used to implement an inexpensive sensor network with lower power consumption using a wireless personal area network (WPAN) scheme. ZigBee is a standard defined from a network layer using IEEE 802.15.4 physical (PHY) and media access control (MAC) layer protocols.

In ZigBee network topology, nodes in a wireless sensor network system are divided into coordinators, routers, and end devices. Here, the coordinator is a top device in a tree structure and manages the tree, and the router is a device functioning as a sub-node of the coordinator or another router and communicates in synchronization with a beacon from the coordinator and the router located on an upper level. In this case, the router may have sub-nodes. The end device is located on the lowest level of the network topology. The end device transmits no beacon, mainly senses an ambient environment using an embedded sensor, and then delivers the sensed data to a router and a coordinator located on an upper level in synchronization with a beacon from the router and the coordinator (a sensor network function), or receives control data from the coordinator and the router to control a controlled subject connected to the end device (a control network function).

In a ZigBee standard, information about neighboring devices is obtained to create a neighbor table and to determine proper beacon transmission and active periods within a range that does not overlap with schedules for the neighboring devices based on the information, in order to prevent a beacon from colliding with other beacons or data transmissions.

However, since the scheduling method in the ZigBee standard is not standardized, problems described below may arise.

Figure 1A:
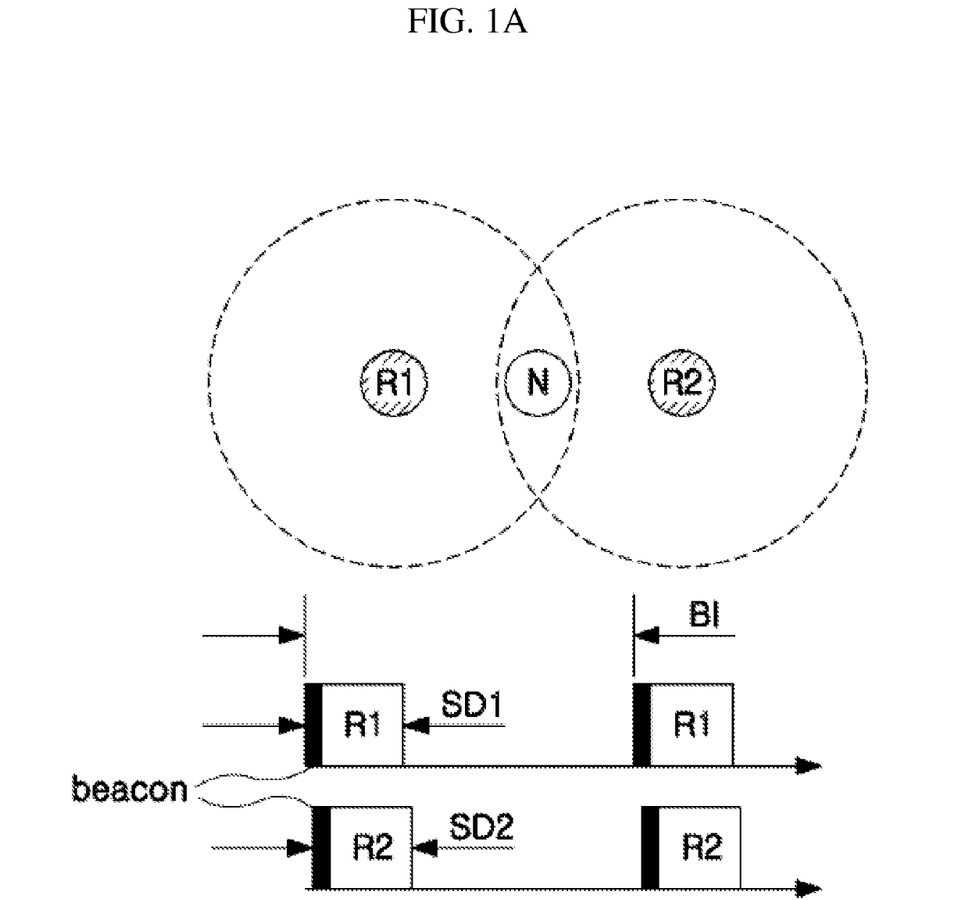
FIGS. 1A and 1B are diagrams for explaining problems of a scheduling method in a ZigBee network.
Figure 1B:
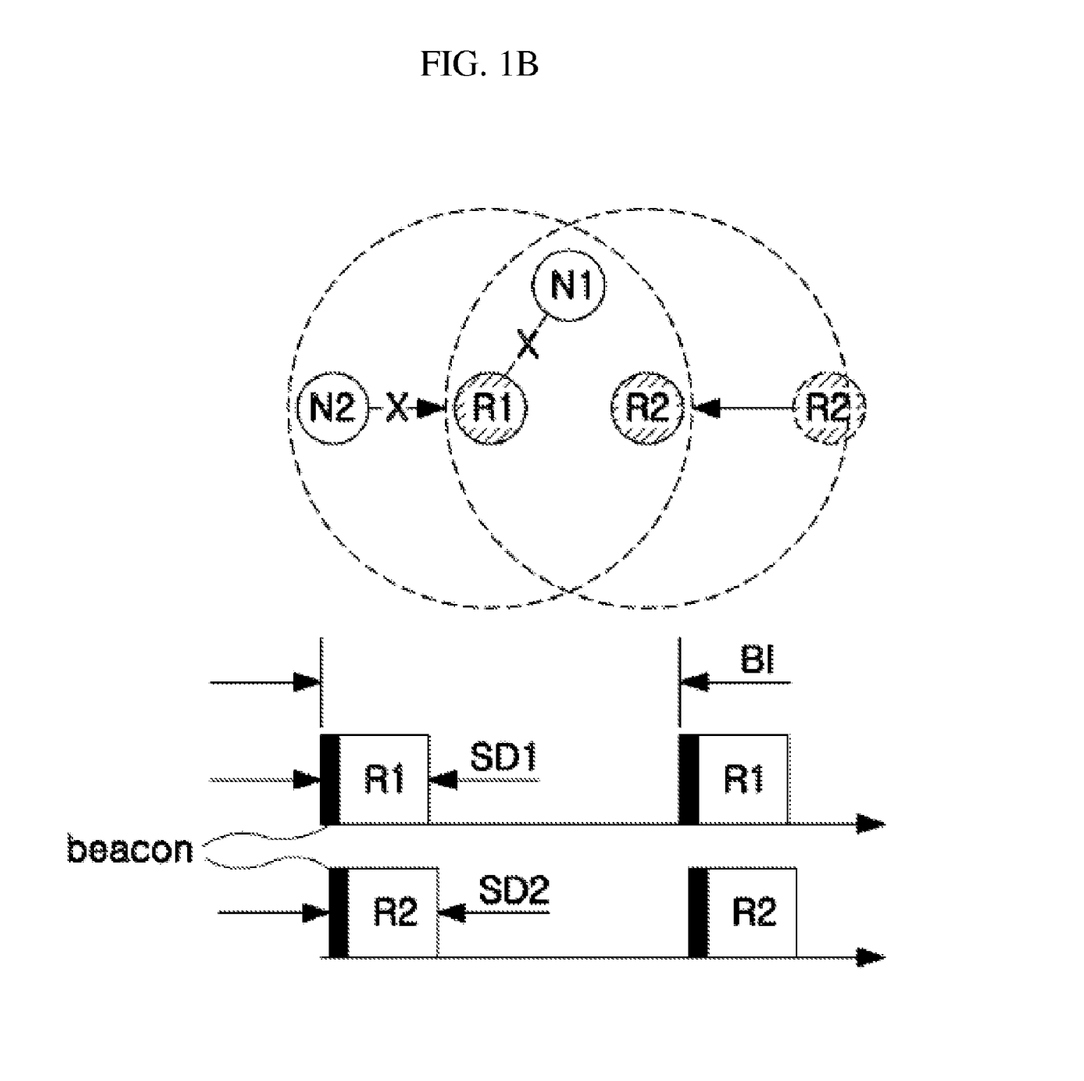

FIGS. 1A and 1B are diagrams for explaining problems of a scheduling method in a ZigBee network. In FIGS. 1A and 1B, black periods indicate beacons, an interval between a start point of the black period and a start point of a next black period is a beacon interval (BI), and a combination of the black period and a period of a router R1, and a combination of the black period and a period of a router R2, form super-frame durations SD1 and SD2 of the routers R1 and R2, respectively.

In FIG. 1A, where the two routers R1 and R2 are set to have different communication areas, i.e., sub-networks, there may not be a problem with collision-free scheduling in each sub-network. However, where a new device N is joined to an overlapping communication area between the two routers R1 and R2 as indicated by a dotted line, beacons from the routers R1 and R2 temporally overlap and collide as shown in FIG. 1A. Accordingly, the device N may not correctly receive the beacon.

Meanwhile, where two routers R1 and R2 are initially set to have different communication areas, i.e., sub-networks, as shown in FIG. 1B, and where the router R2 moves to the communication area of the router R1 as indicated by an arrow, or where a communication environment is changed, the beacons from the routers R1 and R2 may collide. Accordingly, a device N1, which is a child node of the router R1, may not receive the beacon, or a data transmission period of a device N2, which is another child node of the router R1, may overlap with the beacon of the router R2 to damage data.

SUMMARY

According to an aspect, there is provided a beacon scheduling method based on a distributed address assignment scheme that schedules a beacon and minimizes data delay using non-collision of addresses in a network, such as a ZigBee network, that provides a distributed address system.

According to another aspect, there is provided a beacon scheduling method based on a distributed address assignment scheme, wherein a time offset $T_n$ between beacon reception from a parent device and beacon transmission of a device in a wireless network system having a tree structure is obtained from $T_n = SD \times (1 + O_n \times B_d)$ according to an address of the device determined by a distributed address assignment mechanism to create a beacon transmission schedule, where SD denotes a super-frame duration, $O_n$ denotes a value for determining which child among sibling devices in the network the device corresponds to, and $B_d$ denotes a maximum number of router devices that a sub-network having a depth d in a tree can have.

$B_d$ may be obtained from:

$$B_d = \begin{cases} L_m - d, & \text{if } R_m = 1 \\ (R_m^{L_m - d} - 1)/(R_m - 1), & \text{otherwise} \end{cases},$$

$O_n$ may be obtained from:

$$O_n = (A_n - A_{parent} - 1)/C_{skip(d-1)}, \text{ and}$$

$C_{skip(d)}$ may be obtained from:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m - d - 1}}{1 - R_m}, & \text{otherwise} \end{cases}$$

where $A_n$ denotes an address value of the device, $A_{parent}$ denotes an address value of the parent device, $C_{skip}$ denotes a range of addresses that can be assigned to child nodes belonging to the device, $C_m$ denotes a maximum number of all child nodes including routers and end devices, $L_m$ denotes a maximum depth in the network, $R_m$ denotes a maximum number of routers capable of transmitting beacons among child nodes, and d denotes a current depth.

A network may be configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an order of the beacon and SO denotes an order of the super-frame.

According to still another aspect, there is provided a beacon scheduling method based on a distributed address assignment scheme, wherein a time offset $T_n$ between beacon reception from a parent device and beacon transmission of a device in a wireless network system having a tree structure is obtained from $T_n = BI - SD*(1 + O_n*B_d)$ according to an address of the device determined by a distributed address assignment mechanism to create a beacon transmission schedule, where BI denotes a beacon interval, SD denotes a super-frame duration, $O_n$ denotes a value for determining which child among sibling devices in the network the device corresponds to, and $B_d$ denotes a maximum number of router devices that a sub-network having a depth d in a tree can have.

$B_d$ may be obtained from:

$$B_d = \begin{cases} L_m - d, & \text{if } R_m = 1 \\ (R_m^{L_m-d} - 1)/(R_m - 1), & \text{otherwise} \end{cases},$$

$O_n$ may be obtained from:

$O_n = (A_n - A_{parent} - 1)/C_{skip(d-1)}$, and $C_{skip(d)}$ may be obtained from:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m-d-1}}{1 - R_m}, & \text{otherwise} \end{cases}$$

where $A_n$ denotes an address value of the device, $A_{parent}$ denotes an address value of the parent device, $C_{skip}$ denotes a range of addresses that can be assigned to child nodes belonging to the device, and $C_m$ denotes a maximum number of all child nodes including routers and end devices, and $L_m$ denotes a maximum depth in the network, $R_m$ denotes a maximum number of routers capable of transmitting beacons among child nodes, and d denotes a current depth.

Further, a network may be configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon can transmit the beacon within one beacon interval, where BO denotes an order of the beacon and SO denotes an order of the super-frame.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

An exemplary beacon scheduling method taught herein is based on characteristics of a ZigBee address assignment mechanism. Accordingly, teachings provided herein may be useful in utilizing a ZigBee standard as an efficient and substantial technique, in light of the fact that a scheduling method in the ZigBee standard is not believed to be standardized at the moment.

According to an exemplary embodiment, each of routers (including coordinators) transmitting beacons is designed to have a unique beacon transmission period that no other routers in the network use in transmitting the beacon. This condition is provided to realize the beacon scheduling method according to an exemplary embodiment. That is, all routers capable of transmitting a beacon, including coordinators, are designed to transmit the beacon within one beacon interval so that a collision due to a movement of the beacons may be prevented. Such scheduling is feasible where a super-frame has a sufficient margin for enabling all router nodes to transmit the beacon. This condition may be represented by the following Expressions 1 and 2:

$$BI/SD \geq B_m \qquad \text{Expression 1}$$

$$B_m = \begin{cases} L_m, & \text{if } R_m = 1 \\ (R_m^{L_m} - 1)/(R_m - 1), & \text{otherwise} \end{cases} \qquad \text{Expression 2}$$

where BI denotes a beacon interval,
SD denotes a super-frame duration,
$B_m$ denotes a maximum number of devices capable of transmitting the beacon in the network, i.e., coordinators and routers,
$L_m$ denotes a maximum depth in the network, and
$R_m$ denotes a maximum number of routers capable of transmitting beacons that a parent may have as children.

Here, a ratio of the super-frame duration (SD) and the beacon interval (BI) may be represented by Expression 3:

$$BI/SD = \frac{aBaseSuperframeDuration * 2^{BO}}{aBaseSuperframeDuration * 2^{SO}} = 2^{BO-SO}, \qquad \text{Expression 3}$$

where aBaseSuperframeDuration denotes the number of symbols of the super-frame where an order of the super-frame is 0, BO denotes an order of the beacon, and SO denotes an order of the super-frame.

A condition for a collision-free beacon scheduling using the Expressions 1 to 3 may be represented by Expression 4:

$$2^{BO-SO} \geq \begin{cases} L_m, & \text{if } R_m = 1 \\ (R_m^{L_m} - 1)/(R_m - 1), & \text{otherwise} \end{cases} \quad \text{Expression 4}$$

Table 1 below shows exemplary settings for applying the beacon scheduling method according to an exemplary embodiment to a ZigBee standard based on a beacon scheduling condition:

TABLE 1

| Required Routers | Required Max $L_m$ | Available Beacon Slot | SO | BO | Recommended Max $R_m$ |
|---|---|---|---|---|---|
| 40 | 4 | 64 | 0 | 6 | 3 |
| 85 | 4 | 128 | 0 | 7 | 4 |
| 156 | 4 | 256 | 0 | 8 | 5 |
| 400 | 4 | 512 | 0 | 9 | 7 |
| 820 | 4 | 1024 | 0 | 10 | 9 |

As can be seen from Table 1, where the number of required routers and the maximum depth are determined depending on the size of a space of the ZigBee network to be designed, BO and SO may be determined accordingly and the maximum $R_m$ is obtained. Meanwhile, in Table 1, the required routers include only devices capable of transmitting a beacon, excluding end devices that are incapable of transmitting a beacon and only receive it. Inclusion of such end devices increases a total number of nodes.

An exemplary beacon scheduling method to avoid a collision will be described below.

Scheduling to prevent (avoid) a beacon collision is ultimately intended to determine when a device is to transmit a beacon based on a beacon from a parent device, i.e., a coordinator or a parent router. In the exemplary embodiment, a time difference, i.e., a time offset $T_n$ between beacon reception from the parent device and beacon transmission of the device may be determined by Expression 5 according to an address obtained by a distributed address assignment mechanism of a ZigBee:

$$T_n = SD \times (1 + O_n \times B_d), \quad \text{Expression 5}$$

where SD denotes a super-frame duration, $O_n$ denotes a value for determining which child among sibling devices in the network the device corresponds to, and $B_d$ denotes a maximum number of router devices that a sub-network having a depth d in the tree can have. Here, $B_d$ and $O_n$ may be represented by Expressions 6 and 7:

$$B_d = \begin{cases} L_m - d, & \text{if } R_m = 1 \\ (R_m^{L_m-d} - 1)/(R_m - 1), & \text{otherwise} \end{cases} \quad \text{Expression 6}$$

$$O_n = (A_n - A_{parent} - 1)/C_{skip(d-1)} \quad \text{Expression 7}$$

where $A_n$ denotes an address value of the device, $A_{parent}$ denotes an address value of the parent device, and $C_{skip}$ denotes a range (number) of addresses that can be assigned to child nodes belonging to the device, and may be represented by Expression 8:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m-d-1}}{1 - R_m}, & \text{otherwise} \end{cases} \quad \text{Expression 8}$$

A time offset $T_n$, which is a time difference to be ultimately obtained between beacon reception from the parent device and beacon transmission of the device, may be obtained by applying the Expressions 6 to 8 to the Expression 5 and may be represented by Expression 9:

$$T_n = \begin{cases} SD \times (L_m - d), & \text{if } R_m = 1 \\ SD \times \left(1 + \dfrac{A_n - A_{parent} - 1}{C_{skip(d-1)}} \times \dfrac{R_m^{L_m-d} - 1}{R_m - 1}\right), & \text{otherwise} \end{cases} \quad \text{Expression 9}$$

Using the Expression 9, the beacon of the device may be simply scheduled based on the beacon of the parent node. For example, Expression 9 may be effectively applied to a network in which there are a greater number of data transmissions from a top coordinator to a bottom end device, such as a control network. This scheduling may be defined as a forward beacon scheduling ("forward scheduling"). That is, a forward scheduling may be useful when small transmission delay of control information (command) to the bottom end devices is desired.

Figure 2:
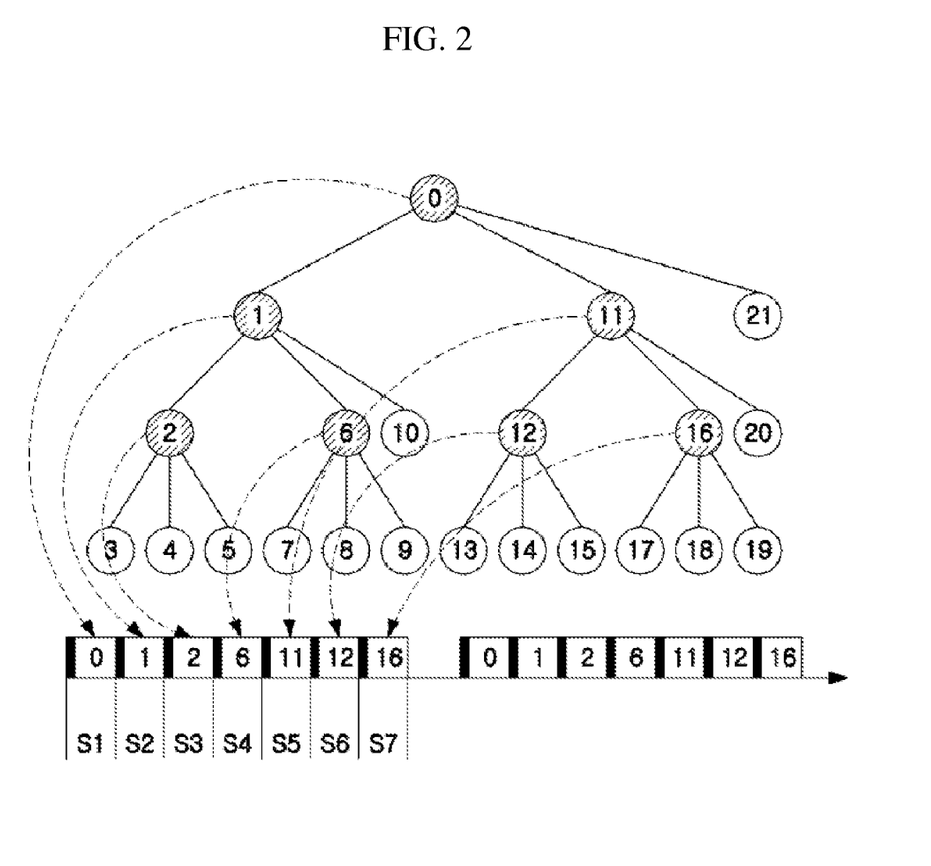
FIG. 2 is a diagram for explaining a forward beacon scheduling in an exemplary beacon scheduling method based on a distributed address assignment scheme.

FIG. 2 illustrates a forward beacon scheduling in a beacon scheduling method based on a distributed address assignment scheme according to an exemplary embodiment. Here, a network in which $R_m$, a maximum number of routers capable of transmitting beacons that a parent may have as children, is 2, $L_m$, a maximum depth in the network, is 3 and $C_m$, a maximum number of all child nodes including routers and end devices, is 3, is exemplified. In FIG. 2, oblique circles indicate the coordinators or the routers, and non-oblique circles indicate the end devices. Each black period indicates the beacon, and a combination of the beacon and a right data period forms a super-frame of a router having an address indicated on the data period. In the exemplary embodiment, it can be seen that there are a total of seven super-frames S1 to S7 in one beacon interval.

As shown in FIG. 2, according to an address assignment scheme in a ZigBee network, a range of addresses of the coordinators, the routers, and the end devices is automatically determined based on $R_m$, $L_m$ and $C_m$. Address "0" is unconditionally assigned to a top coordinator in one network. Meanwhile, according to a forward beacon scheduling method using the Expression 9, a beacon and accordingly a super-frame are assigned to all coordinators and routers in the network, in the order of increasing addresses. The coordinator having an address 0 in FIG. 2 delivers data to routers having addresses 1 and 11 and an end device having an address 21, which are child nodes, during the first super-frame S1 of every beacon interval.

Similarly, the router having the address 1 delivers data to routers having addresses 2 and 6 and an end device having an address 10, which are its child nodes, during the second super-frame S2 of every beacon interval, and the router having the address 2 delivers data to end devices located on a lower level and having addresses 3 to 5, which are its child nodes, during the third super-frame S3 of every beacon interval.

As a result, according to the exemplary forward scheduling method, all routers including coordinators may transmit data to their routers and end devices located on a lower level during their super-frame within one beacon interval. Accordingly, transmission delay may be significantly reduced compared to a conventional method.

$$T_n = BI - SD * (1 + O_n * B_d) \quad \text{Expression 10}$$

$$T_n = \begin{cases} BI - SD \times (L_m - d), & \text{if } R_m = 1 \\ BI - SD \times \left( 1 + \dfrac{A_n - A_{parent} - 1}{C_{skip_{(d-1)}}} \times \dfrac{R_m^{L_m-d} - 1}{R_m - 1} \right), & \text{otherwise} \end{cases} \quad \text{Expression 11}$$

The above Expressions 10 and 11 may be effectively applied to a network in which there are a greater number of data transmissions from a bottom end device to a top coordinator, such as a sensor network. Such scheduling may be defined as a backward beacon scheduling ("backward scheduling"). That is, a backward scheduling is useful when small transmission delay of sensing information to the top coordinator or a router having a smaller depth (i.e., located on an upper level) is desired, as opposed to a forward scheduling. As a result, the Expressions 10 and 11 may be derived by subtracting the respective equations (the upper and lower equations) of the Expression 9 from the beacon interval (BI).

Figure 3:
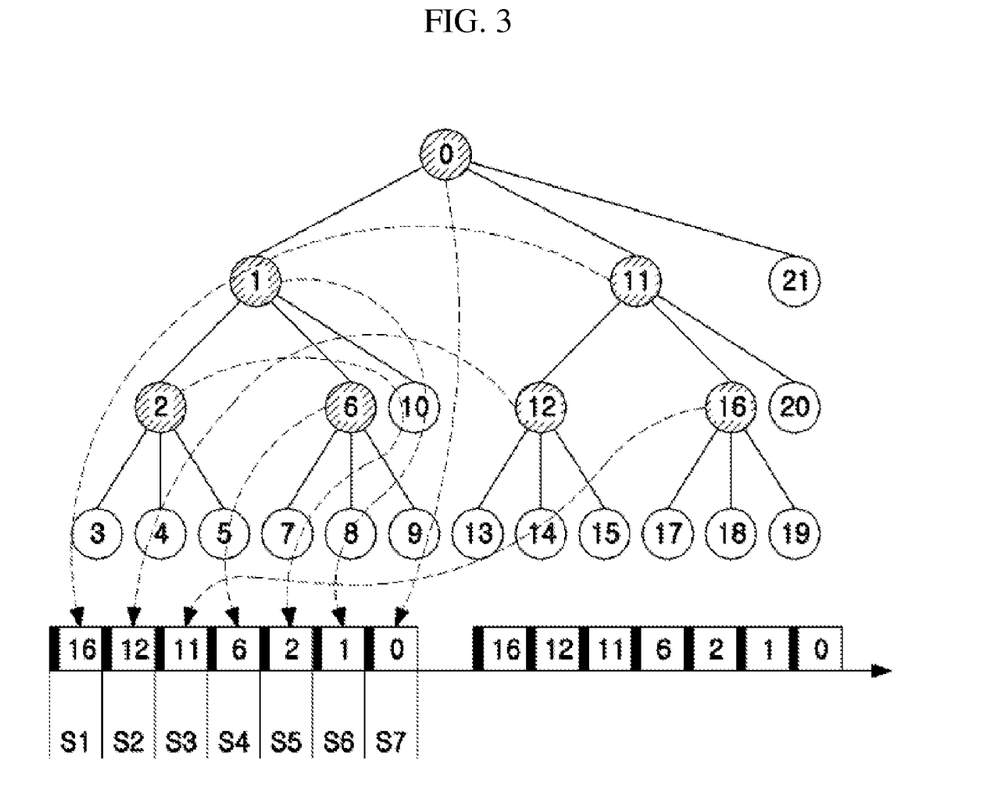
FIG. 3 is a diagram for explaining a backward beacon scheduling in an exemplary beacon scheduling method based on a distributed address assignment scheme.

FIG. 3 illustrates a backward beacon scheduling in a beacon scheduling method based on a distributed address assignment scheme according to an exemplary embodiment. Here, a network in which $R_m=2$, $L_m=3$ and $C_m=3$ is exemplified, as in FIG. 2.

In FIG. 3, oblique circles indicate coordinators or routers, and non-oblique circles indicate end devices, as in FIG. 2. Each black period indicates a beacon, and a combination of the beacon and a right data period forms a super-frame of a router having an address indicated on the data period. In the exemplary embodiment, it can also be seen that there are a total of seven super-frames S1 to S7 in one beacon interval.

According to the exemplary backward beacon scheduling method using the Expressions 10 and 11, a beacon and accordingly a super-frame are assigned to all coordinators and routers existing in the network in the order of decreasing addresses, as opposed to the forward scheduling method of FIG. 2. In FIG. 3, a router having an address 16 may receive data, e.g., sensing data delivered from end devices having addresses 17, 18 and 19, which are its child nodes, during the first super-frame S1 of every beacon interval. Similarly, a router having an address 12 receives data delivered from end devices having addresses 13, 14 and 15, which are its child nodes, during the second super-frame S2 of every beacon interval. Finally, a coordinator having an address 0 receives data delivered from routers having addresses 1 and 11 and an end device having an address 21, which are its child nodes, during the last super-frame S7 of every beacon interval.

As a result, according to the exemplary backward scheduling method, all routers including end devices may transmit data to routers and coordinators located on an upper level and belonging to themselves during their super-frame within one beacon interval. Accordingly, transmission delay may be significantly reduced compared to a conventional method.

According to certain examples described above, beacon collision may be effectively prevented without transmission delay by Expressions 9 and 11. Because most variable values in the expressions are delivered from the coordinator upon joining the network, the coordinators or the routers may easily create their beacon transmission schedules without collision with other routers.

Beacon collision may be avoided and network transmission delay may be minimized by applying a beacon scheduling method according to an exemplary embodiment to a ZigBee network or a network having a similar address assignment mechanism.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A beacon scheduling method by a hardware device based on a distributed address assignment scheme, wherein a time offset $T_n$ between beacon reception by a parent device and beacon transmission by a device in a wireless network system having a tree structure is obtained from $T_n = SD \times (1 + O_n \times B_d)$ according to an address of the device determined by a distributed address assignment mechanism to create a beacon transmission schedule, where SD denotes a super-frame duration, $O_n$ denotes a value for determining which child among sibling devices in the wireless network system the device corresponds to, and $B_d$ denotes a maximum number of router devices that a sub-network having a depth d in the tree structure is capable of having.

2. The method of claim 1, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon, SO denotes an assigned order of the super-frame, $L_m$ denotes a maximum depth in the network, and $R_m$ denotes a maximum number of routers capable of transmitting beacons among child nodes.

3. The method of claim 1, wherein $B_d$ is obtained from:

$$B_d = \begin{cases} L_m - d, & \text{if } R_m = 1 \\ (R_m^{L_m-d} - 1)/(R_m - 1), & \text{otherwise} \end{cases},$$

$O_n$ is obtained from:

$$O_n = (A_n - A_{parent} - 1)/C_{skip(d-1)}, \text{ and}$$

$C_{skip(d)}$ is obtained from:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m-d-1}}{1 - R_m}, & \text{otherwise} \end{cases}$$

where $A_n$ denotes an address value of the device, $A_{parent}$ denotes an address value of the parent device, $C_{skip}$ denotes a range of addresses capable of being assigned to child nodes belonging to the device, and $C_m$ denotes a maximum number of all child nodes including routers and end devices, and $L_m$ denotes a maximum depth in the network, $R_m$ denotes a maximum number of routers capable of transmitting beacons among child nodes, and d denotes a current depth.

4. The method of claim 3, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon and SO denotes an assigned order of the super-frame.

5. A non-transitory computer-readable recording medium having a program recorded thereon for performing the method according to claim 1.

6. The non-transitory computer-readable recording medium of claim 5, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon, SO denotes an assigned order of the super-frame, $L_m$ denotes a maximum depth in the network, and $R_m$ denotes a maximum number of routers capable of transmitting beacons among child nodes.

7. The non-transitory computer-readable recording medium of claim 5, wherein $B_d$ is obtained from:

$$B_d = \begin{cases} L_m - d, & \text{if } R_m = 1 \\ (R_m^{L_m-d} - 1)/(R_m - 1), & \text{otherwise} \end{cases},$$

$O_n$ is obtained from:

$$O_n = (A_n - A_{parent} - 1)/C_{skip(d-1)}, \text{ and}$$

$C_{skip(d)}$ is obtained from:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m-d-1}}{1 - R_m}, & \text{otherwise} \end{cases}$$

where $A_n$ denotes an address value of the device, $A_{parent}$ denotes an address value of the parent device, $C_{skip}$ denotes a range of addresses capable of being assigned to child nodes belonging to the device, and $C_m$ denotes a maximum number of all child nodes including routers and end devices, and $L_m$ denotes a maximum depth in the network, $R_m$ denotes a maximum number of routers capable of transmitting beacons among child nodes, and d denotes a current depth.

8. The non-transitory computer-readable recording medium of claim 7, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon and SO denotes an assigned order of the super-frame.

9. A beacon scheduling method by a hardware device based on a distributed address assignment scheme, wherein a time offset $T_n$ between beacon reception by a parent device and beacon transmission by a device in a wireless network system having a tree structure is obtained from $T_n = BI - SD*(1 + O_n*B_d)$ according to an address of the device determined by a distributed address assignment mechanism to create a beacon transmission schedule, where BI denotes a beacon interval, SD denotes a super-frame duration, $O_n$ denotes a value for determining which child among sibling devices in the network the device corresponds to, and $B_d$ denotes a maximum number of router devices that a sub-network having a depth d in a tree is capable of having.

10. The method of claim 9, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon, SO denotes an assigned order of the super-frame, $L_m$ denotes a maximum depth in the network, and $R_m$ denotes a maximum number of routers capable of transmitting beacons among child nodes.

11. The method of claim 9, wherein $B_d$ is obtained from:

$$B_d = \begin{cases} L_m - d, & \text{if } R_m = 1 \\ (R_m^{L_m-d} - 1)/(R_m - 1), & \text{otherwise} \end{cases},$$

$O_n$ is obtained from:

$$O_n = (A_n - A_{parent} - 1)/C_{skip(d-1)}, \text{ and}$$

$C_{skip(d)}$ is obtained from:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m-d-1}}{1 - R_m}, & \text{otherwise} \end{cases}$$

where $A_n$ denotes an address value of the device, $A_{parent}$ denotes an address value of the parent device, $C_{skip}$ denotes a range of addresses capable of being assigned to child nodes belonging to the device, and $C_m$ denotes a maximum number of all child nodes including routers and end devices, and $L_m$ denotes a maximum depth in the network, $R_m$ denotes a maximum number of routers capable of transmitting beacons among child nodes, and d denotes a current depth.

12. The method of claim 11, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon and SO denotes an assigned order of the super-frame.

13. A non-transitory computer-readable recording medium having a program recorded thereon for performing the method according to claim 9.

14. The non-transitory computer-readable recording medium of claim 13, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon, SO denotes an assigned order of the super-frame, $L_m$ denotes a maximum depth in the network, and $R_m$ denotes a maximum number of routers capable of transmitting beacons among child nodes.

15. The non-transitory computer-readable recording medium of claim 13, wherein $B_d$ is obtained from:

$$B_d = \begin{cases} L_m - d, & \text{if } R_m = 1 \\ (R_m^{L_m-d} - 1)/(R_m - 1), & \text{otherwise} \end{cases},$$

$O_n$ is obtained from:

$$O_n = (A_n - A_{parent} - 1)/C_{skip(d-1)}, \text{ and}$$

$C_{skip(d)}$ is obtained from:

$$C_{skip(d)} = \begin{cases} 1 + C_m \cdot (L_m - d - 1), & \text{if } R_m = 1 \\ \dfrac{1 + C_m - R_m - C_m \cdot R_m^{L_m-d-1}}{1 - R_m}, & \text{otherwise} \end{cases}$$

where $A_n$ denotes an address value of the device, $A_{parent}$ denotes an address value of the parent device, $C_{skip}$ denotes a range of addresses capable of being assigned to child nodes belonging to the device, and $C_m$ denotes a maximum number of all child nodes including routers and end devices, and $L_m$ denotes a maximum depth in the network, $R_m$ denotes a maximum number of routers capable of transmitting beacons among child nodes, and d denotes a current depth.

16. The non-transitory computer-readable recording medium of claim 15, wherein the wireless network system is configured from:

$$2^{BO-SO} \geq \begin{cases} L_m, & \text{if } R_m = 1 \\ (R_m^{L_m} - 1)/(R_m - 1), & \text{otherwise} \end{cases}$$

so that all routers, including coordinators, that are capable of transmitting a beacon are capable of transmitting the beacon within one beacon interval, where BO denotes an assigned order of the beacon and SO denotes an assigned order of the super-frame.

\* \* \* \* \*